US012573520B2

(12) United States Patent
Hoshikawa et al.

(10) Patent No.: US 12,573,520 B2
(45) Date of Patent: Mar. 10, 2026

(54) EXTRUDED ALUMINUM WIRE

(71) Applicant: SUMITOMO CHEMICAL COMPANY, LIMITED, Tokyo (JP)

(72) Inventors: Hiroaki Hoshikawa, Niihama (JP); Akira Nagata, Niihama (JP); Yuji Kubota, Niihama (JP); Nana Arai, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 20 days.

(21) Appl. No.: 18/723,039

(22) PCT Filed: Nov. 9, 2022

(86) PCT No.: PCT/JP2022/041760
§ 371 (c)(1),
(2) Date: Jun. 21, 2024

(87) PCT Pub. No.: WO2023/119926
PCT Pub. Date: Jun. 29, 2023

(65) Prior Publication Data
US 2025/0062049 A1 Feb. 20, 2025

(30) Foreign Application Priority Data
Dec. 24, 2021 (JP) ................................ 2021-211128

(51) Int. Cl.
*H01B 1/02* (2006.01)
*B21C 23/00* (2006.01)
(Continued)

(52) U.S. Cl.
CPC ........... *H01B 1/023* (2013.01); *B21C 23/002* (2013.01); *B21C 29/003* (2013.01); (Continued)

(58) Field of Classification Search
None
See application file for complete search history.

(56) References Cited

U.S. PATENT DOCUMENTS 10,689,041 B2 * 6/2020 Florey ..................... C22F 1/043
10,808,299 B2 * 10/2020 Kaneko .................. H01B 1/023
(Continued)

FOREIGN PATENT DOCUMENTS

CN 105803268 B 12/2017
JP S59-056737 A 4/1984
(Continued)

OTHER PUBLICATIONS

Aluminum Kako Gijutsu Binran (Aluminum Processing Technology Handbook), The Nikkan Kogyo Shimbun, Ltd., 1970, p. 128-129.

*Primary Examiner* — Daniel J. Schleis
(74) *Attorney, Agent, or Firm* — Foley & Lardner LLP

(57) ABSTRACT

Disclosed is an extruded aluminum wire including: Fe, Cu, Ti, Mn, Mg, Cr, B, Ga, V and Zn in the total content of 0.01% by mass or less, and one or more components selected from the group consisting of Ni, Y and Si, with the balance being Al and inevitable impurities, wherein, in a cross-section perpendicular to the longitudinal direction of the extruded wire, an average grain size measured by electron backscatter diffraction is 15 to 50 μm, respectively, in both a central measurement region including a center point of the cross-section and a peripheral measurement region in contact with the outer periphery of the cross-section.

9 Claims, 1 Drawing Sheet

(51) Int. Cl.

| | |
|---|---|
| ***B21C 29/00*** | (2006.01) |
| ***B21C 37/04*** | (2006.01) |
| ***C22C 21/00*** | (2006.01) |
| ***C22F 1/04*** | (2006.01) |

(52) U.S. Cl.

CPC .......... *B21C 37/045* (2013.01); *B21C 37/047* (2013.01); *C22C 21/00* (2013.01); *C22F 1/04* (2013.01)

(56) References Cited

U.S. PATENT DOCUMENTS

| | | | | |
|---|---|---|---|---|
| 11,682,499 | B2 * | 6/2023 | Kusakari ................. | C22C 21/10<br>174/110 A |
| 2019/0096538 | A1 | 3/2019 | Li et al. | |
| 2022/0152749 | A1 | 5/2022 | Yamada et al. | |

FOREIGN PATENT DOCUMENTS

| | | | |
|---|---|---|---|
| JP | H08-108214 | A | 4/1996 |
| JP | 2008-156694 | A | 7/2008 |
| JP | 2008-254059 | A | 10/2008 |
| JP | 2019-512050 | A | 5/2019 |
| WO | WO-2020/184655 | A1 | 9/2020 |

* cited by examiner

EXTRUDED ALUMINUM WIRE

CROSS-REFERENCE TO RELATED APPLICATIONS

The present application claims priority under 35 U.S.C. § 371 to International Patent Application No. PCT/JP2022/041760, filed Nov. 9, 2022, which claims priority to and the benefit of Japanese Patent Application No. 2021-211128, filed on Dec. 24, 2021. The contents of these applications are hereby incorporated by reference in their entireties.

TECHNICAL FIELD

The present disclosure relates to an extruded aluminum wire.

BACKGROUND ART

Extruded aluminum products produced by extrusion technology have been known for a long time.

For example, Non-Patent Document 1 discloses that, in extrusion molding of AA1100 series aluminum alloy, the extrusion temperature is suitably 400 to 500° C. and the container temperature is suitably 360 to 460° C. Patent Document 1 relates to a high-purity aluminum sputtering target, and describes that an extruded product having a grain size of 100 μm or less can be obtained by extruding high-purity aluminum at low temperature of 300° C. or lower.

Patent Document 2 relates to a highly electrically conductive and heat-resistant iron-containing light aluminum wire, and discloses that the extrusion temperature is 300 to 450° C.

Patent Document 3 relates to a method for producing a rod for an aluminum wire, and discloses that aluminum containing 40 to 60 ppm of Ni and 5 to 10 ppm of Si is extruded at the billet temperature of 360 to 380° C. and the container temperature of 380 to 420° C.

PRIOR ART DOCUMENT

Patent Document

Patent Document 1: JP 2008-156694 A
Patent Document 2: JP 2019-512050 A
Patent Document 3: Chinese Patent No. 105803268

Non-Patent Document

Non-Patent Document 1: Aluminum Kako Gijutsu Binran (Aluminum Processing Technology Handbook), THE NIKKAN KOGYO SHIMBUN, LTD., 1970, pp. 128

DISCLOSURE OF THE INVENTION

Problems to be Solved by the Invention

In general aluminum alloys, since a strength is determined by precipitation strengthening and solid solution strengthening due to additional elements, the strength can be made constant over the entire length of an extruded aluminum alloy wire by keeping the composition constant.

Extruded aluminum wires used for overhead transmission lines and other electric wires, and superconducting stabilization materials, and used for fine wire processing, are, for example, made of aluminum materials in which 1000 ppm by mass or less of specific chemical components are intentionally added to high-purity aluminum having a purity of 4N or higher.

Such extruded aluminum wires are prone to have low strength due to trace amounts of additional elements. The strength cannot be controlled by the additional elements and may vary along the length direction of the extruded aluminum wire. For example, an extruded wire extruded immediately after the start of extrusion (extrusion start) has relatively high strength and then the strength gradually decreases, and the extruded wire extruded at the final stage of extrusion (extrusion completion) (sometimes referred to as "tail of extruded wire") underwent significant reduction in strength.

However, in both Non-Patent Document 1 and Patent Documents 1 to 3, no regard is given to the strength uniformity in the length direction of the extruded aluminum wire.

Thus, an object of one embodiment of the present invention is to provide an extruded aluminum wire made of aluminum containing small additive amounts of alloying elements, which has high strength and high strength uniformity in the length direction.

Means for Solving the Problems

Aspect 1 of the present invention provides an extruded aluminum wire including:

Fe, Cu, Ti, Mn, Mg, Cr, B, Ga, V and Zn in the total content of 0.01% by mass or less, and one or more components selected from the group consisting of Ni, Y and Si, with the balance being Al and inevitable impurities, wherein, in a cross-section perpendicular to the longitudinal direction of the extruded wire, an average grain size measured by electron backscatter diffraction is 15 to 50 μm, respectively, in both the central measurement region including the center point of the cross-section and the peripheral measurement region in contact with the outer periphery of the cross-section.

Aspect 2 of the present invention provides the extruded aluminum wire according to aspect 1, which satisfies the following formula (1):

$$|Dp - Dc| \leq 20\ (\mu m) \quad (1)$$

Wherein,

Dc is an average grain size (μm) in the central measurement region of the cross-section, and Dp is an average grain size (μm) in the peripheral measurement region of the cross-section.

Aspect 3 of the present invention provides the extruded aluminum wire according to aspect 1 or 2, wherein an area ratio of the region where kernel average misorientation within grains is 0.2° or more is 15 to 30%, respectively, in both the central measurement region and the peripheral measurement region.

Aspect 4 of the present invention provides the extruded aluminum wire according to any one of aspects 1 to 3, which satisfies the following formula (2):

$$|Rc - Rp| \leq 5\ (\%) \quad (2)$$

Wherein,

Rc is an area ratio (%) of the region where kernel average misorientation in the central measurement region of the cross-section is 0.2° or more, and Rp is an area ratio (%) of the region where kernel average misorientation in the peripheral measurement region of the cross-section is 0.2° or more.

Aspect 5 of the present invention provides the extruded aluminum wire according to any one of aspects 1 to 4, which satisfies the following formula (3):

$$|STD1 - STD2| \leq 0.02 \quad (3)$$

Wherein,

STD1 is a standard deviation of the measured value (°) of kernel average misorientation in the central measurement region of the cross-section, and STD2 is a standard deviation of the measured value (°) of kernel average misorientation in the peripheral measurement region of the cross-section, when the kernel average misorientation within grains in the cross-section is measured by electron backscatter diffraction.

Aspect 6 of the present invention provides the extruded aluminum wire according to any one of aspects 1 to 5, wherein the total content of one or more components selected from the group consisting of Ni, Y and Si is 10 to 2,000 ppm by mass.

Aspect 7 of the present invention provides the extruded aluminum wire according to any one of aspects 1 to 6, which has a diameter of 1 to 10 mm.

Aspect 8 of the present invention provides the extruded aluminum wire according to any one of aspects 1 to 7, which is used for aluminum wiring of semiconductor devices.

Aspect 9 of the present invention provides the extruded aluminum wire according to any one of aspects 1 to 8, which is used as a superconducting stabilizing material used at 20 K or less.

Effects of the Invention

According to one embodiment of the present invention, it is possible to provide an extruded aluminum wire made of aluminum containing small additive amounts of alloying elements, which has high strength and high strength uniformity in the length direction.

MODE FOR CARRYING OUT THE INVENTION

Figure 1A:
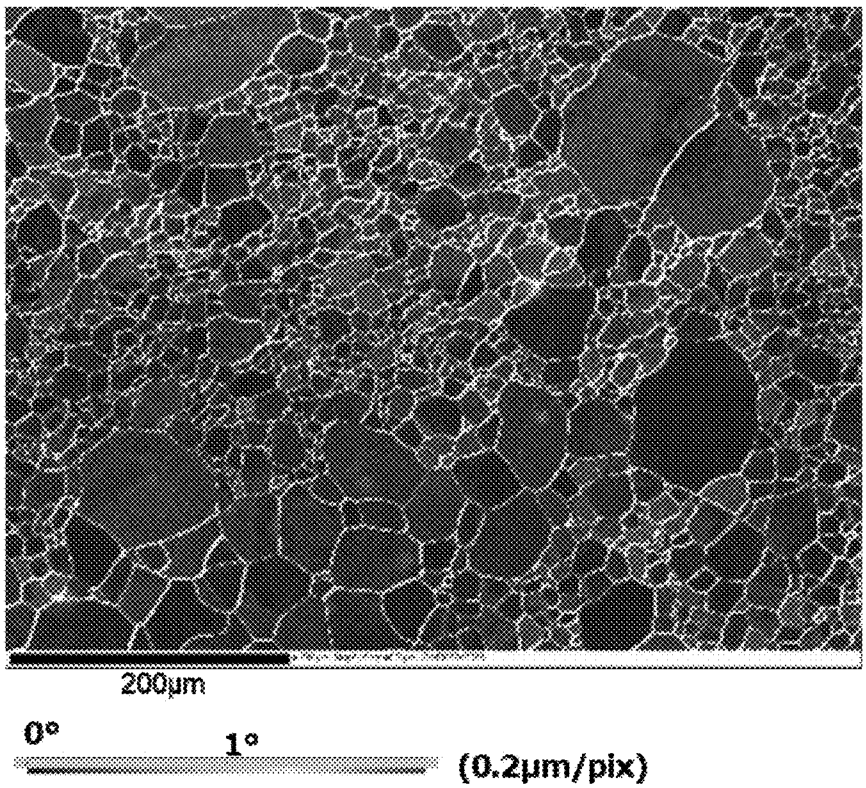
FIG. 1A is an EBSD-KAM map measured in a central measurement region of a cross-section perpendicular to a longitudinal direction of an extruded Al wire.
Figure 1B:
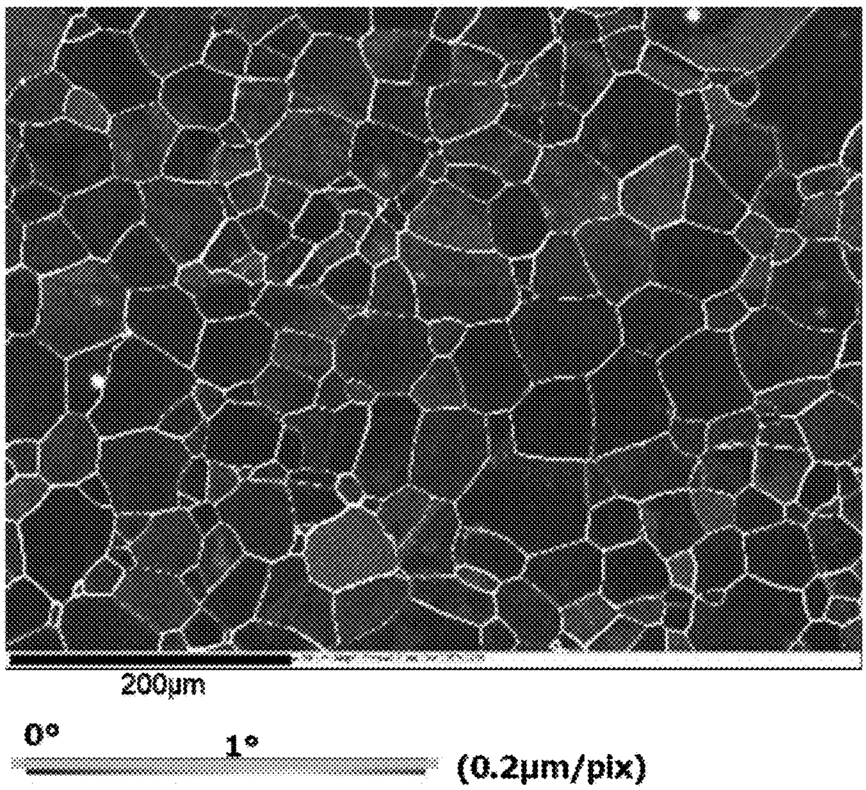
FIG. 1B is an EBSD-KAM map measured in a peripheral measurement region of a cross-section perpendicular to a longitudinal direction of an extruded Al wire.

The inventors of the present invention have intensively studied, focused on the fact that an extruded aluminum wire containing small additive amounts of alloying elements is prone to have low strength and to cause variation in strength in the length direction of the extruded wire (strength non-uniformity). The results show that precipitation strengthening and solid solution strengthening are less likely to develop in such an extruded aluminum wire due to small additive amounts of alloying elements, and that a grain size is the dominant factor in the strength of the extruded aluminum wire. The inventors of the present invention have further studied based on this knowledge and found that, by controlling both a grain size in a central measurement region and a grain size in a peripheral measurement region in a cross-section perpendicular to a longitudinal direction of the extruded aluminum wire within an appropriate range, the strength of the extruded aluminum wire can be appropriately controlled and, as a result, strength variation in the longitudinal direction can be suppressed and strength uniformity in the longitudinal direction can be improved, thus completing the present invention.

In the extruded wires of ordinary aluminum (AA1100 series) and aluminum alloys, general strengthening mechanisms, namely, precipitation strengthening and grain boundary strengthening, as well as work hardening, act during extrusion molding, leading to an increase in strength of the extruded wires. Therefore, small influence is exerted on strength change due to the grain size. Therefore, according to conventional knowledge, the grain size is not focus of attention, when studying the strength uniformity in the length direction of the extruded wire.

The extruded aluminum wire according to the embodiment of the present invention will be described below.

[Extruded Aluminum Wire]

1. Chemical Composition

The chemical composition of the extruded aluminum wire (hereinafter sometimes simply referred to as "extruded wire") according to the embodiment includes:

Fe, Cu, Ti, Mn, Mg, Cr, B, Ga, V and Zn in the total content of 0.01% by mass or less, and one or more components selected from the group consisting of Ni, Y and Si, with the balance being Al and inevitable impurities. Inevitable impurities mean trace impurities contained in aluminum raw materials (primary ingot, etc.).

In the extruded wire according to the embodiment, specific elements are intentionally added to high-purity aluminum. Here, intentionally added components (hereinafter sometimes referred to as "intentionally added components" or simply referred to as "additive components") are Ni, Y and Si. These elements are fine precipitation strengthening elements.

The chemical composition excluding the intentionally added components includes Fe, Cu, Ti, Mn, Mg, Cr, B, Ga, V and Zn in the total content of 0.01% by mass or less, with the balance being Al and inevitable impurities. In other words, when excluding the intentionally added components, the resultant material is high-purity aluminum having a purity of 4N (99.99% by mass) or higher.

The content of one or more components selected from the group consisting of Ni, Y and Si as intentionally added components is preferably 10 to 2000 ppm by mass, and more preferably 30 to 300 ppm by mass.

Each of intentionally added components is preferably contained in the following range to exert the effect of fine precipitation strengthening.

When containing Ni as the intentionally added component, the Ni content can be set at 10 to 1000 ppm by mass and is preferably 30 to 300 ppm by mass, and particularly preferably 30 to 100 ppm by mass.

When containing Y as the intentionally added component, the Y content can be set at 10 to 2000 ppm by mass and can also be set at 30 to 1000 ppm by mass, and is particularly preferably 50 to 300 ppm by mass.

When containing Si as the intentionally added component, the Si content can be set at 10 to 100 ppm by mass.

As used herein, the material in which predetermined intentionally added components are added to high-purity aluminum (4N or higher) is sometimes called "high-purity aluminum base material".

2. Crystal Structure

The extruded aluminum wire according to the embodiment has the following crystal structure.

(Grain Size)

In a cross-section perpendicular to the longitudinal direction of the extruded aluminum wire according to the embodiment, an average grain size measured by electron backscatter diffraction (EBSD) is 15 to 50 μm, respectively, in both a central measurement region including a center point of the cross-section and a peripheral measurement region in contact with an outer periphery of the cross-section. The average grain size is preferably within a range of 27.5 to 50 μm, more preferably 28 to 46 μm, and particularly preferably 29 to 40 μm.

The inventors of the present invention have found for the first time that the extruded wire having such a grain size has high strength uniformity in the length direction, even though an extruded aluminum wire made of aluminum containing small additive amounts of alloying elements.

The reason why such an effect is obtained is not clear, but it is presumed that the grain boundary strengthening mechanism of the high-purity aluminum base material has an optimum range of the grain size, and when the grain size is larger than the optimum range, grain boundary strengthening becomes insufficient, and when the grain size is smaller than the optimum range, recrystallization occurs easily during processing, locally increasing the grain size, and thus the grain boundary strengthening mechanism does not function sufficiently.

The center point of the cross-section perpendicular to the longitudinal direction is a center point of the circle when the outer periphery of the cross-section is circular, or an intersection point of the major axis and minor axis when the cross-section is elliptical. In the case of a polygon, the center point of the cross-section is an intersection point when multiple diagonals intersect at one point, or a center point of the circumcircle of the polygon when multiple diagonals do not intersect at one point.

The central measurement region is preferably positioned so that the intersection of diagonals of the central measurement region overlaps with the center point of the cross-section. The central measurement region is, for example, a rectangular area of 0.46 mm×0.61 mm. When the extruded aluminum wire has a small diameter, the dimension of the central measurement region may be reduced. When the extruded aluminum wire has a diameter of 1.6 mm or less, the central measurement region is a rectangular region of 0.23 mm×0.31 mm. When the extruded aluminum wire has a diameter of more than 1.6 mm, the central measurement region may be a rectangular region of 0.46 mm×0.61 mm.

The peripheral measurement region is preferably positioned so that both ends of one of the two opposing long sides of the peripheral measurement region are in contact with the outer periphery of the cross-section. The peripheral measurement region is, for example, a rectangular area of 0.46 mm×0.61 mm. When the extruded aluminum wire has a small diameter, the dimension of the peripheral measurement region may be reduced. When the extruded aluminum wire has a diameter of 1.6 mm or less, the peripheral measurement region is a rectangular region of 0.23 mm×0.31 mm. When the extruded aluminum wire has a diameter of more than 1.6 mm, the peripheral measurement region may be a rectangular region of 0.46 mm×0.61 mm.

When there are sags in the outer periphery of the cross-section, the outer peripheral shape may be defined excluding the portion where sags are generated.

The presence or absence of sags is determined as follows: when the focus within the peripheral measurement region is not evenly aligned in the scanning electron microscope (SEM) observation, it is determined that sags are generated.

The measurement of the cross-section by the EBSD method is performed as follows.

The EBSD method is a general-purpose method for analyzing orientation distribution of crystal textures. The EBSD method is usually performed using an apparatus of a scanning electron microscope (SEM) equipped with an electron backscatter diffraction detector. It is possible to use, as the electron backscatter diffraction detector, for example, Symmetry manufactured by Oxford Instruments.

An observation sample having a predetermined length (for example, 25 mm in length) is cut out from an extruded wire by cutting in the cross-section perpendicular to the longitudinal direction of the extruded wire. The observation sample thus cut out is embedded in a resin and the cross-section is polished and etched. The cross-section is then scanned by the electron beam and a diffraction pattern of backscattered electrons is read by an apparatus.

Specifically, first, the diffraction pattern of backscattered electrons loaded into the apparatus is imported into a computer, and then the sample surface is scanned while performing crystal orientation analysis with analysis software. This allows indexing of crystals at each measurement point, and the crystal orientation at each measurement point is determined. At this time, a continuous region with the same crystal orientation is defined as one crystal grain and a mapping image of the crystal grain distribution, that is, grain map is obtained. In defining one crystal grain, the same crystal orientation is defined when the angular difference in crystal orientation between adjacent crystals is 10° or less.

This allows the computer to record images of grains based on the crystal orientation calculated at each measurement point.

Further image processing is performed to obtain a measured value of the circular equivalent diameter of the grain size. The average of the circular equivalent diameters is obtained as an area weighted average, and this is referred to as "average grain size".

It is preferable that the extruded aluminum wire according to the embodiment satisfies the following formula (1):

$$|Dp - Dc| \leq 20\,(\mu\text{m}) \tag{1}$$

Wherein,

Dc is an average grain size (μm) in the central measurement region of the cross-section, Dp is an average grain size (μm) in the peripheral measurement region of the cross-section.

By controlling the difference (absolute value) between the average grain size Dc in the central measurement region and the average grain size Dp in the peripheral measurement region of the cross-section to 20 μm or less, the strength in the length direction of the extruded wire can be made more uniform. The reason why such an effect is obtained is not clear, but it is presumed that the mechanism is as follows.

As mentioned above, in an extruded aluminum wire containing small additive amounts of alloying elements, precipitation strengthening and solid solution strengthening can be ignored, and the grain size is the dominant factor of the strength of the extruded wire. In the extruded aluminum wire containing small additive amounts of alloying elements, the processing temperature exerts a large influence.

Regarding extrusion molding, in the cross-section perpendicular to the longitudinal direction, the flow rate of aluminum significantly differs between the central portion and the peripheral portion. In an aluminum extrusion billet, since the peripheral portion in contact with a container is frictionally restrained, the flow rate of aluminum in the peripheral portion becomes smaller than that in the central portion. The shear deformation region is partially formed due to the difference in flow rate. As a result, regarding the extruded aluminum wire thus obtained, in the cross-section perpendicular to the longitudinal direction, the grain size significantly differs between the central measurement region and the peripheral measurement region. Particularly, the differences in grain size are significantly large at the tail of the extruded wire. The strength of the extruded aluminum wire containing small additive amounts of alloying elements is greatly influenced by the grain size, thus leading to deterioration of the strength uniformity in the length direction of the extruded wire.

Therefore, by reducing the difference in flow rate of aluminum between the central portion and the peripheral portion from extrusion start to extrusion completion of extrusion molding, the difference in grain size between the central measurement region and the peripheral measurement region can be reduced, thus making it possible to significantly reduce the strength variation in the length direction of the extruded wire. In other words, by improving the uniformity of grain size in the cross-section perpendicular to the longitudinal direction of the extruded wire, the strength uniformity in the length direction of the extruded wire can be improved.

As mentioned below, it is possible to reduce the difference in flow rate of aluminum between the central portion and the peripheral portion by setting the container temperature of the extruding machine during extrusion molding to be 20 to 80° C. lower than the billet temperature.

(Kernel Average Misorientation within Grains)

The area ratio of the region where kernel average misorientation within grains is 0.2° or more is preferably 15 to 30%, more preferably 15 to 25%, and still more preferably 15 to 20%, respectively, in both the central measurement region and the peripheral measurement region.

By moderately including a high strain region, an increase in strength due to work hardening can be expected, and the effect of increasing the strength is likely to exert uniformly in the length direction of the extruded wire. Therefore, it is possible to obtain an extruded wire having higher strength and higher strength uniformity.

The kernel average misorientation (KAM) is one of analysis methods of EBSD, which measures the difference in crystal orientation between the measurement point and its vicinity. The larger the kernel average misorientation, the greater the strain within grains.

The area ratio of the region where the kernel average misorientation (KAM) is 0.2° or more (sometimes referred to as "high kernel average misorientation region" or "high strain region") is a ratio of an area of a region where KAM is 0.2° or more (high strain region) to an area of a measurement range (for example, 0.46 mm×0.61 mm=0.28 mm$^2$) as 100%. The higher the area ratio of the high strain area, the higher the work hardening effect.

The sample prepared by the same procedure as in the measurement sample of the cross-section by the EBSD method mentioned above is subjected to measurement using the same apparatus. The measurement step is 0.2 μm/pix. The resulting diffraction pattern of backscattered electrons is analyzed by the analysis software AZtec to calculate a cumulative frequency of the region where kernel average misorientation is 0.2° or more (high kernel average misorientation region), which was taken as the area of the high strain region. The area of the high strain region is divided by the area of the measurement region (for example, 0.28 mm$^2$) to determine an area ratio of the high strain region.

To exclude the grain boundary at this time, when KAM is 10° or more, it is identified as the grain boundary and excluded from the calculation of the area ratio.

It is preferable that the extruded wire satisfies the following formula (2):

$$|Rc - Rp| \leq 5\ (\%) \tag{2}$$

Wherein,

Rc is an area ratio (%) of the region where kernel average misorientation in the central measurement region of the cross-section is 0.2° or more, and Rp is an area ratio (%) of the region where kernel average misorientation in the peripheral measurement region of the cross-section is 0.2° or more.

The formula (2) suggests that the area ratio Rc of the region where kernel average misorientation in the central measurement region of the cross-section is 0.2° or more (high strain region) is close to the area ratio Rp of the region where kernel average misorientation in the peripheral measurement region of the cross-section is 0.2° or more (high strain region).

As mentioned above, the high strain region can contribute to strength increase due to work hardening. Therefore, when the area ratio of the high strain region is relatively uniform in the cross-section, the strength in the cross-section becomes relatively uniform, thus enabling further improvement in strength uniformity throughout the extruded wire.

As mentioned below, it is possible to reduce the difference in flow rate of aluminum between the central portion and the peripheral portion by setting the container temperature of the extruding machine during extrusion molding to be 20 to 80° C. lower than the billet temperature.

When the kernel average misorientation (KAM) within grains in the cross-section is measured by electron backscatter diffraction, it is preferable to satisfy the following formula (3):

$$|STD1 - STD2| \leq 0.02 \tag{3}$$

Wherein,

STD1 is a standard deviation of the measured value (°) of kernel average misorientation in the central measurement region of the cross-section, and STD2 is a standard deviation of the measured value (°) of kernel average misorientation in the peripheral measurement region of the cross-section.

When the distribution of the kernel average misorientation (KAM) in the central measurement region and the peripheral measurement region of the cross-section is uniform, the standard deviation of each KAM becomes smaller and the difference (absolute value) in standard deviation also becomes smaller. In other words, the variation of KAM in the central measurement region and the peripheral measurement region of the cross-section becomes smaller by satisfying the formula (3). When the area ratio of the high strain region is relatively uniform in the cross-section, the strength in the cross-section becomes relatively uniform, thus enabling further improvement in strength uniformity throughout the extruded wire.

As mentioned below, it is possible to reduce the difference in flow rate of aluminum between the central portion and the peripheral portion by setting the container temperature of the extruding machine during extrusion molding to be 20 to 80° C. lower than the billet temperature.

The extruded aluminum wire can have any size and shape depending on applications, and may have a diameter of 1 to 10 mm.

The extruded aluminum wire according to the embodiment is made of a high-purity aluminum base material and is therefore suitable for aluminum wiring of semiconductor devices, superconducting stabilizing materials used at 20 K or less, and the like.

It is preferable to control the type and content of intentionally added components in the extruded aluminum wire depending on the application.

(Method for Producing Extruded Aluminum Wire)

The method for producing an extruded aluminum wire according to the embodiment will be described. A person skilled in the art who has come into contact with the disclosure of the present application may conceive a different method capable of producing an extruded aluminum wire according to the embodiment based on those descriptions.

To a raw material of high-purity aluminum (for example, Al having a purity of 99.99% (4N) or higher), predetermined amounts of intentionally added components (one or more components of Ni, Y, Si) are added, followed by stirring and further melting and holding. Thereafter, a billet is obtained by casting using a usual method and further processed to fabricate an extrusion billet with desired dimension.

After heating the extrusion billet to a billet preheating temperature (referred to as "billet temperature"), extrusion molding is performed using an extruding machine. The billet temperature may be set within a range of the billet temperature used in general extrusion molding.

During extrusion molding, a heating temperature of a container of the extruding machine (this is referred to as "container temperature") is set to be 20 to 80° C. lower than the billet temperature. In other words, the billet temperature BL and the container temperature C are set so that (billet temperature BL-container temperature C) is 20 to 80° C. This allows the average grain size in the central measurement region and the peripheral measurement region of the cross-section perpendicular to the longitudinal direction of the extruded wire to be 15 to 50 μm, and the difference between the average grain size Dc in the central measurement region and the average grain size Dp in the peripheral measurement region to be 20 μm or less.

Furthermore, by setting the difference of (billet temperature BL-container temperature C) to 20 to 60° C., the area ratios of the high strain regions in both the central measurement region and the peripheral measurement region of the cross-section can be set to 15 to 30%, and the difference ΔR between the area ratio Rc of the high strain region in the central measurement region and the area ratio Rp of the high strain region in the peripheral measurement region can be set at 5% or less. It is also possible to set the difference in the standard deviation of kernel average misorientation (KAM) between the central measurement region and the peripheral measurement region of the cross-section at 0.02 or less. (Billet temperature BL-container temperature C) is more preferably within a range of 25 to 45° C., and still more preferably 30 to 40° C.

Conventionally, in order to maintain the billet temperature, the container temperature was kept at the same level as the billet temperature (usually the temperature difference is within 10° C.). However, in the extruded aluminum wire according to the embodiment, moderate strain is generated within the grains of the resulting extruded wire by setting the container temperature to be 20° C. to 80° C. lower than the billet temperature. Thus, an extruded wire having a desired grain size can be obtained.

EXAMPLES

The measurement sample of an extruded aluminum wire was fabricated according to the following procedure.

(1) Fabrication of Measurement Sample

High purity aluminum (Al having a purity of 99.999%) obtained by a three-layer electrolysis process was used as an Al raw material.

The high-purity aluminum raw material was placed in a graphite crucible and Ni was added as an intentionally added component and, after stirring and degassing (maintained in vacuum at 700° C. for 2 hours), a billet was obtained by casting at 740° C. using a graphite mold having an inner diameter of 100 mm (100 mm in inner diameter×230 mm in inside height).

The billet thus obtained was processed to fabricate an extrusion billet having dimensions of 70 mm in diameter and 180 mm in length. Thereafter, the extrusion billet was extruded to obtain an extruded wire having a diameter of 2 mm and a length of about 50 m.

The billet temperature BL and the container temperature C during extrusion molding were controlled so as to satisfy "difference ΔT between the billet temperature BL and the container temperature C during extrusion molding (=billet temperature BL (° C.)–container temperature C (° C.))" shown in Table 1 to fabricate extruded wires of Examples 1 to 3 and Comparative Examples 1 to 4. The billet temperature BL during extrusion molding was set at 350 to 390° C., which was a general billet temperature during extrusion molding of the high-purity aluminum material.

With respect to the respective extruded wires thus obtained, the contents of twelve elements were measured by optical emission spectroscopy. In all measurement samples, the content of Ni was 50 mass ppm, and the total content of Si, Fe, Cu, Ti, Mn, Mg, Cr, B, Ga, V and Zn was 18 ppm by mass.

A portion with a length of 2 meters from the extrusion start and a portion with a length of 2 meters from the extrusion completion (tail) of the extruded wires were removed as non-steady portions.

Thereafter, samples were cut out from an end of an extrusion start side and an end of an extrusion completion side (tail side) of the extruded wire. First, metal wires (200 mm each) were cut out from both ends to fabricate tensile test pieces (samples) for tensile strength test, and then a sample (25 mm) for the measurement of the grain size was cut out from the extrusion completion side.

TABLE 1

| Sample No. | Difference between billet temperature BL and container temperature C ΔT = BL − C (° C.) | |
|---|---|---|
| 1 | −20 | Comparative Example 1 |
| 2 | 0 | Comparative Example 2 |
| 3 | 100 | Comparative Example 3 |
| 4 | 90 | Comparative Example 4 |
| 5 | 30 | Example 1 |
| 6 | 40 | Example 2 |
| 7 | 70 | Example 3 |

(Measurement of Grain size)

The crystal structure was observed by the electron backscatter diffraction method (EBSD method).

The sample having the length of 25 mm was cut out from the end of the extrusion completion side by cutting at the cross-section perpendicular to the longitudinal direction of the extruded wire. The cut-out sample was embedded in a resin, and then the cross-section was polished and etched. The cross-section was then scanned by the electron beam and a diffraction pattern of backscattered electrons was read by an apparatus.

According to the procedure described in the embodiment, the cross-section of each sample was measured by the EBSD method to determine the average grain size. JSM-7900F manufactured by JEOL Ltd. was used as the scanning electron microscope, and Symmetry manufactured by Oxford Instruments Ltd. was used as the electron backscatter diffraction detector.

The average grain sizes in the central measurement region and the peripheral measurement region of the cross-section for each of Examples 1 to 3 and Comparative Examples 1 to 4 were shown in Table 2. It was evaluated whether or not each average grain size satisfies the requirements (average grain size of 15 to 50 μm) of the embodiment, and the symbol "S" was listed in the table when the requirement was satisfied, whereas the symbol "NS" was listed when the requirement was not satisfied.

Furthermore, the difference (absolute value) ΔD between the average grain size Dc in the central measurement region and the average grain size Dp in the peripheral measurement region was calculated and shown in Table 2. It was evaluated whether or not ΔD was in the preferable range (ΔD≤20 μm) of the embodiment, and the symbol "S" was listed in the table when the condition was satisfied, whereas the symbol "NS" was listed when the condition was not satisfied.

(Measurement of Kernel Average Misorientation within Grains)

According to the procedure described in the embodiment, the kernel average misorientation (KAM) within grains in the cross-section of each sample was measured to determine the area ratio of the region where KAM is 0.2° or more (high strain region).

The area ratios of the high strain regions in both the central measurement region and the peripheral measurement region of the cross-section for each of Examples 1 to 3 and Comparative Examples 1 to 4 were shown in Table 3. They were evaluated whether or not each area ratio of the high strain region was in the preferable range (the area ratio of the high strain region is 15 to 30%) of the embodiment, and the symbol "S" was listed in the table when the condition was satisfied, whereas the symbol "NS" was listed when the condition was not satisfied.

Furthermore, the difference (absolute value) ΔR between the high strain area Rc in the central measurement regions and the high strain area Rp in the peripheral measurement regions was calculated and shown in Table 3. It was evaluated whether or not ΔR was in the preferable range (ΔR≤5%) of the embodiment, and the symbol "S" was listed in the table when the condition was satisfied, whereas the symbol "NS" was listed when the condition was not satisfied.

The average value, the standard deviation and the mode of KAM were determined from the measured values of KAM within grains in the cross-section of each sample. The average value, the standard deviation and the mode of KAM of both the central measurement region and peripheral measurement region in the cross-section for each of Examples 1 to 3 and Comparative Examples 1 to 4 were shown in Table 4.

Furthermore, the difference (absolute value) ΔSTD between the standard deviation STD1 in the central measurement regions and the standard deviation STD2 in the peripheral measurement regions was calculated and shown in Table 4. It was evaluated whether or not ΔSTD was in the preferable range (ΔSTD≤0.02) of the embodiment, and the symbol "S" was listed in the table when the condition was satisfied, whereas the symbol "NS" was listed when the condition was not satisfied.

(Evaluation of Tensile Strength)

Metal wires each having a length of 200 mm were cut out from the end of the extrusion start side and the end of the extrusion completion side (tail side) of the extruded wire. The cut-out metal wires were processed to obtain tensile test pieces (samples). The size and shape of each tensile test piece are the same as in JIS Z 2241:2011 No. 4 test piece.

The tensile test was performed in accordance with JIS Z 2241:2011. After gripping 50 mm of both ends of the tensile test piece with chucks, the tensile test was performed at a tensile speed of 20 mm/min to measure the tensile strength. The tensile test method was performed in accordance with JIS Z 2241:2011.

The tensile strength TS1 of the sample at the extrusion start side and the tensile strength TS2 of the sample at the extrusion completion side (tail side) for each of Examples 1 to 3 and Comparative Examples 1 to 4 were shown in Table 5. When TS2 is 53.5 MPa or more was classified as A, when TS2 is 52 MPa or more and less than 53.5 MPa was classified as B, and when TS2 is less than 52 MPa was classified as C.

Furthermore, the difference ΔTS (i.e., TS1-TS2) between the tensile strength TS1 of the sample at the extrusion start side and the tensile strength TS2 of the sample at the extrusion completion side (tail side) was calculated and shown in Table 5. When ΔTS is 5 MPa or less was classified as A, when ΔTS is 10 MPa or less and more than 5 MPa was classified as B, and when ΔTS is more than 10 MPa was classified as C.

The comprehensive evaluation of each sample was performed based on the evaluation results of TS2 and ΔTS. When at least one evaluation is C, the comprehensive evaluation was classified as C, and when both evaluations are A, the comprehensive evaluation was classified as A. Otherwise, the comprehensive evaluation was classified as B.

TABLE 2

| | Circle equivalent diameter of grains (EBSD, area weighted average) | | | | | | |
|---|---|---|---|---|---|---|---|
| Sample No. | Average grain size of central measurement region Dc (μm) | Whether or not condition 1: Dc = 15 to 50 (μm) is satisfied? | Average grain size of peripheral measurement region Dp (μm) | Whether or not condition 2: Dp = 15 to 50 (μm) is satisfied? | Difference in average grain sizes (absolute value) ΔD (μm) = \|Dp − Dc\| | Whether or not ΔD ≤ 20 (μm) is satisfied? | |
| 1 | 42.5 | S | 53.8 | NS | 11.2 | S | Comparative Example 1 |
| 2 | 32.5 | S | 84.0 | NS | 51.5 | NS | Comparative Example 2 |
| 3 | 10.9 | NS | 36.3 | S | 25.3 | NS | Comparative Example 3 |
| 4 | 7.6 | NS | 34.4 | S | 26.9 | NS | Comparative Example 4 |
| 5 | 30.8 | S | 45.8 | S | 15.1 | S | Example 1 |
| 6 | 29.9 | S | 38.1 | S | 8.2 | S | Example 2 |
| 7 | 18.5 | S | 27.0 | S | 8.5 | S | Example 3 |

*In table, "S" means that the condition is satisfied, whereas "NS" means that the condition is not satisfied.

TABLE 3

| | Region where kernel average misorientation (KAM) is 0.2° or more (high strain region) | | | | | | |
|---|---|---|---|---|---|---|---|
| Sample No. | Area ratio of high strain region of central measurement region Re (%) | Whether or not condition 3: Rc = 15 to 30 (%) is satisfied? | Area ratio of high strain region of peripheral measurement region Rp (%) | Whether or not condition 4: Rp = 15 to 30 (%) is satisfied? | Difference in area ratio of high strain region (absolute value) ΔR (%) = \|Re − Rp\| | Whether or not ΔR ≤ 5% is satisfied? | |
| 1 | 16 | S | 7 | NS | 9 | NS | Comparative Example 1 |
| 2 | 31 | NS | 12 | NS | 19 | NS | Comparative Example 2 |
| 3 | 33 | NS | 15 | S | 18 | NS | Comparative Example 3 |
| 4 | 33 | NS | 13 | NS | 20 | NS | Comparative Example 4 |
| 5 | 20 | S | 18 | S | 2 | S | Example 1 |
| 6 | 16 | S | 16 | S | 0 | S | Example 2 |
| 7 | 64 | NS | 27 | S | 37 | NS | Example 3 |

*In table, "S" means that the condition is satisfied, whereas "NS" means that the condition is not satisfied.

TABLE 4

| | Kernel average misorientation (KAM) (°) | | | | | | | | |
|---|---|---|---|---|---|---|---|---|---|
| | Central measurement region | | | Peripheral measurement region | | | Difference in standard deviation (absolute value) | Whether or not | |
| Sample No. | Average value | Standard deviation (STD1) | Mode | Average value | Standard deviation (STD2) | Mode | ΔSTD = \|STD1 − STD2\| | ΔSTD ≤ 0.02 is satisfied? | |
| 1 | 0.157 | 0.115 | 0.065 | 0.121 | 0.086 | 0.065 | 0.030 | NS | Comparative Example 1 |
| 2 | 0.206 | 0.127 | 0.115 | 0.156 | 0.085 | 0.105 | 0.042 | NS | Comparative Example 2 |

TABLE 4-continued

| Sample No. | Kernel average misorientation (KAM) (°) Central measurement region Average value | Standard deviation (STD1) | Mode | Peripheral measurement region Average value | Standard deviation (STD2) | Mode | Difference in standard deviation (absolute value) ΔSTD = \|STD1 − STD2\| | Whether or not ΔSTD ≤ 0.02 is satisfied? | |
|---|---|---|---|---|---|---|---|---|---|
| 3 | 0.229 | 0.156 | 0.125 | 0.159 | 0.119 | 0.085 | 0.037 | NS | Comparative Example 3 |
| 4 | 0.222 | 0.155 | 0.115 | 0.148 | 0.115 | 0.055 | 0.040 | NS | Comparative Example 4 |
| 5 | 0.167 | 0.123 | 0.065 | 0.158 | 0.113 | 0.055 | 0.011 | S | Example 1 |
| 6 | 0.150 | 0.116 | 0.055 | 0.146 | 0.116 | 0.045 | 0.000 | S | Example 2 |
| 7 | 0.328 | 0.175 | 0.265 | 0.201 | 0.126 | 0.105 | 0.049 | NS | Example 3 |

*In table, “S” means that the condition is satisfied, whereas “NS” means that the condition is not satisfied.

TABLE 5

| Sample No. | Tensile strength of extruded wire (extrusion start) TS1 (MPa) | Tensile strength of extruded wire (extrusion completion) TS2 (MPa) | Evaluation of TS2 (MPa) TS2 ≥ 53.5: A 53.5 > TS2 ≥ 52: B 52 > TS2: C | Difference in tensile strength ΔTS (MPa) (TS1 − TS2) | Evaluation of ΔTS (MPa) ΔTS ≤ 5: A 5 < ΔTS ≤ 10: B 10 < ΔTS: C | Comprehensive evaluation | |
|---|---|---|---|---|---|---|---|
| 1 | 64.5 | 51.9 | C | 12.6 | C | C | Comparative Example 1 |
| 2 | 62.2 | 51.3 | C | 10.9 | C | C | Comparative Example 2 |
| 3 | 59.3 | 50.4 | C | 8.9 | B | C | Comparative Example 3 |
| 4 | 58.8 | 49.5 | C | 9.3 | B | C | Comparative Example 4 |
| 5 | 58.5 | 53.5 | A | 5.0 | A | A | Example 1 |
| 6 | 58.1 | 55.5 | A | 2.6 | A | A | Example 2 |
| 7 | 59.0 | 53.2 | B | 5.8 | B | B | Example 3 |

In Examples 1 to 3, since the difference between the billet temperature BL and the container temperature C (i.e., billet temperature BL-container temperature C) during extrusion molding was 20 to 80° C., both the average grain sizes Dc in the central measurement region and Dp in the peripheral measurement region of the cross-section of the extruded wire were 15 to 50 μm, and the difference ΔD between the average grain sizes Dc and Dp was 20 μm or less (see Table 2). Therefore, the tensile strength of the extruded wire at extrusion completion (tail) was high, and the difference in tensile strength of the extruded wire between extrusion start and extrusion completion (tail) was small. In other words, the extruded wires of Examples 1 to 3 exhibited not only high strength, but also little variation in strength in the longitudinal direction and high strength uniformity.

In particular, in Examples 1 and 2, since the difference between the billet temperature BL and the container temperature C was 20 to 60° C., both area ratios Rc and Rp of the region where the kernel average misorientation within grains in the central measurement region and the peripheral measurement region is 0.2° or more were 15 to 30%, the difference ΔR between the area ratios Rc and Rp was 5% or less, and the difference ΔSTD between the standard deviations STD1 and STD2 of the measured value (°) of the kernel average misorientation in the central measurement region and the peripheral measurement region, respectively, was 0.02 or less. As a result, both the tensile strength of the extruded wire at extrusion completion (tail) and the strength uniformity in the length direction of the extruded wire were particularly high.

In Comparative Example 1, the difference between the billet temperature BL and the container temperature C was −20° C., and the container temperature was higher than the billet temperature. Therefore, the average grain size in the peripheral measurement region exceeded 50 μm. As a result, the tensile strength of the extruded wire at extrusion completion (tail) was low, and the difference in tensile strength of the extruded wire between extrusion start and extrusion completion (tail) was large.

In Comparative Example 2, the difference between the billet temperature BL and the container temperature C was 0° C. Therefore, the average grain size in the peripheral measurement region exceeded 50 μm, and the difference in average grain size between the central measurement region and the peripheral measurement region exceeded 20 μm. As a result, the tensile strength of the extruded wire at extrusion completion (tail) was low, and the difference in tensile strength of the extruded wire between extrusion start and extrusion completion (tail) was large.

In Comparative Example 3, the difference between the billet temperature BL and the container temperature C was 100° C., which was large temperature difference. Therefore, the average grain size in the central measurement regions was less than 15 μm. As a result, the tensile strength of the extruded wire at extrusion completion (tail) was low.

Similar to Comparative Example 3, Comparative Example 4 exhibited a large temperature difference of 90° C. between the billet temperature BL and the container temperature C. Therefore, the average grain size in the central measurement regions was less than 15 μm. As a result, the tensile strength of the extruded wire at extrusion completion (tail) was low.

This application claims priority based on Japanese Patent Application No. 2021-211128 filed on Dec. 24, 2021, the disclosure of which is incorporated by reference herein.

The invention claimed is:

1. An extruded aluminum wire comprising:

Fe, Cu, Ti, Mn, Mg, Cr, B, Ga, V and Zn, wherein a total content of 0.01% by mass or less, and one or more components selected from the group consisting of Ni, Y and Si, with the balance being Al and inevitable impurities, wherein, in a cross-section perpendicular to the longitudinal direction of the extruded wire, an average grain size measured by electron backscatter diffraction is 15 to 50 μm, respectively, in both a central measurement region including a center point of the cross-section and a peripheral measurement region in contact with the outer periphery of the cross-section, wherein the central measurement region is a rectangular region positioned so that an intersection of diagonals of the central measurement region overlaps with the center point of the cross-section, for the extruded aluminum wire having a diameter of 1.6 mm or less, the central measurement region is a rectangular region of 0.23 mm×0.31 mm, for the extruded aluminum wire having the diameter of more than 1.6 mm, the central measurement region is a rectangular region of 0.46 mm×0.61 mm; and wherein the peripheral measurement region is a rectangular region positioned so that each end of one of two opposing long sides of the peripheral measurement region are in contact with the outer periphery of the cross-section, for the extruded aluminum wire having the diameter of 1.6 mm or less, the peripheral measurement region is a rectangular region of 0.23 mm×0.31 mm; for the extruded aluminum wire having the diameter of more than 1.6 mm, the peripheral measurement region is a rectangular region of 0.46 mm×0.61 mm.

2. The extruded aluminum wire according to claim 1, which satisfies the following formula (1):

$$|Dp - Dc| \leq 20\,(\mu\text{m}) \quad (1)$$

Wherein,

Dc is an average grain size (μm) in the central measurement region of the cross-section, and Dp is an average grain size (μm) in the peripheral measurement region of the cross-section.

3. The extruded aluminum wire according to claim 1, wherein an area ratio of a region where kernel average misorientation within grains is 0.2° or more is 15 to 30%, respectively, in both the central measurement region and the peripheral measurement region.

4. The extruded aluminum wire according to claim 1, which satisfies the following formula (2):

$$|Rc - Rp| \leq 5\,(\%) \quad (2)$$

Wherein,

Rc is an area ratio (%) of a region where kernel average misorientation in the central measurement region of the cross-section is 0.2° or more, and Rp is an area ratio (%) of a region where kernel average misorientation in the peripheral measurement region of the cross-section is 0.2° or more.

5. The extruded aluminum wire according to claim 1, which satisfies the following formula (3):

$$|STD1 - STD2| \leq 0.02 \quad (3)$$

Wherein,

STD1 is a standard deviation of a measured value (°) of kernel average misorientation in the central measurement region of the cross-section, and STD2 is a standard deviation of a measured value (°) of kernel average misorientation in the peripheral measurement region of the cross-section, when the kernel average misorientation within grains in the cross-section is measured by electron backscatter diffraction.

6. The extruded aluminum wire according to claim 1, wherein the total content of one or more components selected from the group consisting of Ni, Y and Si is 10 to 2000 ppm by mass.

7. The extruded aluminum wire according to claim 1, which has a diameter of 1 to 10 mm.

8. A semiconductor device comprising the extruded aluminum wire according to claim 1.

9. A semiconductor stabilizing material comprising the extruded aluminum wire according to claim 1.

* * * * *